United States Patent
Fisher, Jr. et al.

[15] 3,666,677

[45] May 30, 1972

[54] SHORT PERSISTENCE ZINC SULFIDE BLUE PHOSPHOR AND METHOD OF PREPARING SAME

[72] Inventors: Philip C. Fisher, Jr.; Kenneth H. Shaner, both of Towanda, Pa.

[73] Assignee: Sylvania Electric Products Inc.

[22] Filed: Apr. 29, 1971

[21] Appl. No.: 138,739

Related U.S. Application Data

[63] Continuation of Ser. No. 816,816, Apr. 16, 1969, abandoned.

[52] U.S. Cl. .................................................252/301.6 S
[51] Int. Cl. ..............................................C09k 1/12
[58] Field of Search ......................................252/301.6 S

[56] References Cited

UNITED STATES PATENTS

| | | |
|---|---|---|
| 2,421,207 | 5/1947 | Leverenz ..................252/301.6 S |
| 2,474,506 | 6/1949 | Wood .......................252/301.6 S |
| 2,600,263 | 6/1952 | Prener .....................252/301.6 S |
| 2,623,858 | 12/1952 | Kroger ....................252/301.6 S |
| 3,290,255 | 12/1966 | Smith ......................252/301.6 S |

*Primary Examiner*—James E. Poer
*Assistant Examiner*—J. Cooper
*Attorney*—Norman J. O'Malley, Donald R. Castle and William H. McNeill

[57] ABSTRACT

A phosphor composition that emits blue color under cathode ray excitation and has a reduced decay time and a process for preparing same are disclosed. The phosphor composition comprises a predominant portion of silver-activated zinc sulfide and an effective amount of aluminum oxide. The process comprises forming a mixture comprising an effective amount of an aluminum source and a predominant portion of a silver-activated zinc sulfide composition and firing the mixture in an oxidizing atmosphere at a temperature of above about 1,700° F. for a time sufficient to produce said phosphor composition.

6 Claims, No Drawings

SHORT PERSISTENCE ZINC SULFIDE BLUE PHOSPHOR AND METHOD OF PREPARING SAME

This application is a continuation of application Ser. No. 816,816, filed Apr. 16, 1969, now abandoned.

BACKGROUND OF THE INVENTION

This invention relates to blue-emitting cathodoluminescent phosphors. More particularly, it relates to improved silver-activated zinc sulfide phosphor compositions and processes for preparing same.

Commercial picture tubes for color television include a viewing screen comprising red-emitting, green-emitting and blue-emitting phosphors. The phosphors are generally arranged in groups of three dots, one dot for each type of phosphor. Several factors complicate the relatively simple principle thereby influencing the fidelity of the color reproduction. Among these factors is the decay characteristics of the phosphors. When decay characteristics of the phosphors are not matched, the viewed image is distorted, particularly when images of moving objects are displayed.

During the past few years both the red-emitting and green-emitting phosphors have undergone considerable change. New phosphors have been developed with the primary emphasis upon brightness of the phosphors. Over these years of development, the blue-emitting phosphor has been zinc sulfide with a silver activator. This phosphor, although it has a relatively long decay time, has remained substantially unchanged. Since brighter and more efficient red-emitting and green-emitting phosphors that have relatively short decay time have been developed, the fidelity of color television can be improved by the use of a blue-emitting phosphor with a reduced decay time, thereby reducing the blue-trailing, thus constituting an advancement in the art.

SUMMARY OF THE INVENTION

In accordance with one aspect of this invention there is provided an improved blue-emitting phosphor composition having a decay time significantly less than silver-activated zinc sulfide comprising a major portion of a silver-activated zinc sulfide and an effective amount of aluminum.

In accordance with an additional aspect of this invention, there is provided a process for producing the improved blue-emitting phosphor composition; the process comprises forming a relatively uniform mixture of zinc sulfide, a silver activator and an effective amount of an aluminum source and heating the mixture at a temperature of at least about 1,700° F. for a time sufficient to convert said mixture into a blue-emitting phosphor composition and thereafter washing said composition to thereby produce a blue-emitting phosphor having a significantly reduced decay time.

For a better understanding of the present invention, together with other and further objects, advantages and capabilities thereof, reference is made to the following disclosure and appended claims in connection with the above description of some of the aspects of the invention.

DESCRIPTION OF THE PREFERRED EMBODIMENTS

As was previously mentioned, the improved blue-emitting phosphors of the present invention comprise a major or predominant portion of silver-activated zinc sulfide and an effective amount of aluminum. Although relatively minute amounts of aluminum, such as little as 0.01 percent by weight of the total weight of the phosphor composition, results in a phosphor composition that has a decay time less than that of the previously used silver-activated zinc sulfide phosphors without any appreciable color shift. Compositions containing aluminum in amounts greater than 0.01 percent by weight and preferably 0.2 to 1 percent by weight have been found to be particularly well suited for the color television industry when used in conjunction with the newer rare earth red-emitting phosphors.

In the manufacture of the blue-emitting zinc sulfide phosphors heretofore used, alkaline earth metal or alkali metal salt fluxes such as the chlorides, phosphates and nitrates, were generally employed as a mixture with the zinc sulfide and the silver activator. During the heating or firing of the zinc sulfide, to convert it into a phosphor, the fluxes served to produce a phosphor having the desired particle size. Generally, the individual fluxes are used in amounts of less than about 5 percent by weight of the zinc sulfide raw materials used to make the phosphor composition. In the practice of the present invention, the foregoing fluxes, such as sodium chloride, barium chloride, magnesium chloride, can be employed in the amounts heretofore indicated. In most instances the anion portion forms the volatile chlorine gas and is evolved during the heating cycle. The cation portion of the flux can combine with oxygen to form the metal oxide and remain in the phosphor as an oxide or be incorporated into the matrix as the metal form of the corresponding cation, and are generally in amounts of from about 0.01 percent to about 0.2 percent by weight of the phosphor. The alkali metal cation is generally from about 0.01 percent to about 0.05 percent by weight of the phosphor, and the alkaline earth metal cation is found at from about 0.01 percent to about 0.15 percent by weight of the phosphor.

As previously mentioned, silver is used as the activator for the blue-emitting zinc sulfide phosphor. In most instances, a silver salt is employed that has a fugitive or volatile anion, that is an anion that will form a volatile component upon the thermal decomposition of the salt. Such salts must decompose in the foregoing manner at temperatures of below about 1,700° F. Silver, in its metallic form, is then combined in the matrix of the host zinc sulfide phosphor to yield a blue-emitting, cathodoluminescent phosphor.

In the practice of this invention, an aluminum source is employed that thermally decomposes to form a volatile or fugitive component derived from the anion portion of the aluminum source and the aluminum portion of the source forms either the metallic form of aluminum or aluminum oxide. Aluminum trichloride hexahydrate is a preferred aluminum source. Upon heating to a temperature of above about 1,200° F., chlorine gas is evolved and the aluminum can form aluminum oxide under oxidizing conditions. Other aluminum sources can be used such as aluminum nitrate, sulfate and the like. Generally, aluminum salts of the mineral acids are preferred with aluminum chloride hexahydrate being especially preferred.

It is believed to be surprising that aluminum gives the desired effect because many aluminum containing materials, including aluminum oxide, are activators for various phosphors, and therefore, would normally be expected to cause a significant color shift in the blue-emitting phosphor. The phosphor composition of this invention, however, exhibits essentially the same characteristics with the exception of the decreased decay time, as silver-activated zinc sulfide phosphor compositions without the aluminum.

The change in decay time is related to the amount of aluminum employed in the raw material used to make the phosphor composition at levels of aluminum below about 6 percent by weight. More than 6 percent does not appreciably reduce the decay time below that achieved at lower levels such as 4 to 5 percent, and can result in a change of at least some of the other characteristics of the blue-emitting phosphor. While these higher levels of aluminum can be used, in most instances these higher levels have no appreciable beneficial effect over the preferred levels hence are not normally used. As the raw materials are heated, then washed to produce the phosphor composition, the amount of aluminum in the composition will vary within the range of from about 0.01 percent to about 1.0 percent by weight of the phosphor composition.

After the mixture of zinc sulfide, a silver salt containing a fugitive anion and an aluminum source is formed, the mixture is heated to at least about 1,700° F. for a sufficient period of time to convert the material into the desired blue-emitting phosphor. The period of heating is known in the art of producing zinc sulfide phosphors and it is not detailed herein. Since both the activator, the fluxes and the aluminum sources are generally comprised of materials having a volatile or fugitive cation, the time period of heating is essentially unchanged from that used in producing the prior art blue-emitting zinc sulfide phosphors.

After the heating step, the phosphor is washed in deionized water to remove any residual and unreacted fluxes, persistance modifiers and the like.

After being washed, the solid silver-activated phosphors containing the effective amounts of aluminum, are removed by conventional solid-liquid separation means, preferably by filtration. After the solid, phosphor compositions are removed from the mother liquor or the liquid phase, the solids are dried at about 110° C. and are then ready for commercial use.

To more fully illustrate some of the aspects of this invention, the following detailed examples are presented. All parts, percentages and proportions are by weight unless otherwise indicated.

EXAMPLE I

A relatively uniform mixture of about 100 parts of zinc sulfide, about 3 parts of barium chloride dihydrate, about 3 parts of aluminum chloride hexahydrate and about 0.05 parts of silver nitrate are prepared by mixing the foregoing ingredients in a conventional ribbon blender for about 45 minutes.

After the uniform mixture is prepared it is fired at a temperature of about 1,750° F. for about 2 hours. After the fired material is cooled it is washed with deionized water by slurrying the fired material in about 8 parts of water. The slurry is then filtered and the solids are removed and dried at about 110° C. until essentially no moisture is detected in the material.

Samples of material that pass through the openings in a 325 mesh (U.S. Standard Sieve) indicate equivalent brightness to samples prepared in the same manner without aluminum chloride hexahydrate. The decay time of the phosphor is found to be about one-half of that of the phosphor prepared without the aluminum chloride.

The elemental analysis of a sample of the material indicates the following amounts of components in percentages by weight:

| | |
|---|---|
| Zn | 66.8% |
| Ag | 0.027% |
| Ba | 0.1% |
| Al | 0.43% |
| $NO_3$ | <0.05% |
| S | 31.8% |
| Cl | 0.014% |

The above analysis indicates that essentially all of the chloride and nitrate is evolved during the heating operation but that significant amounts of the metals are retained in the phosphor composition.

EXAMPLE II

Other phosphors are parepared in a similar manner to that prepared in Example I except that different fluxes are used. The ingredients used are shown in Table 1 following:

PARTS BY WEIGHT

| Phosphor | $AlCl_3 \cdot 6H_2O$ | NaCl | $BaCl_2$ | $MgCl_2$ | $Na_2HPO_4$ |
|---|---|---|---|---|---|
| 1 | 3% | 1% | | | |
| 2 | 3% | | 3% | | |
| 3 | 3% | | | 3% | 3% |
| 4 | 3% | | | 3% | 3% |
| 5 | 3% | | 3% | | |
| 6 | 3% | | 3% | 3% | |
| 7 | 3% | | 3% | 3% | |
| 8 | 3% | | 3% | 3% | |
| 9 | 3% | | 3% | 3% | |

The decay time of the samples as measured by the Rolling Raster Technique which is a ratio of the decay time of a test phosphor to that of a standard phosphor is given in Table II following:

TABLE II

| Phosphor | Ratio |
|---|---|
| 1 | 0.94 |
| 2 | 0.94 |
| 3 | 0.70 |
| 4 | 0.80 |
| 5 | 1.0 |
| 6 | 0.70 |
| 7 | 1.4 |
| 8 | 0.93 |
| 9 | 0.75 |

Samples of production quantities of silver-activated zinc sulfide phosphors as normally used in present color television screens and tested by the same technique range from about 1.75 for the shortest decay time to about 2.43.

It can be seen, therefore, that the phosphors of the present invention have an appreciable shorter decay time than do the phosphors of the prior art.

While there has been shown and described what are, at present, considered the preferred embodiments of the invention, it will be obvious to those skilled in the art that various changes and modifications may be made therein without departing from the scope of the invention as defined by the appended claims.

We claim:

1. A blue-emitting cathodoluminescent phosphor composition having a reduced decay time consisting essentially of silver-activated zinc sulfide host, from about 0.01 percent to about 1 percent by weight of aluminum, as aluminum oxide, from about 0.01 percent to about 0.05 percent by weight of an alkali metal and from about 0.01 percent to about 0.15 percent by weight of an alkaline earth metal.

2. A composition according to claim 1 wherein said alkaline earth metal is barium.

3. A composition according to claim 2 wherein said alkali metal is sodium.

4. A process for preparing an aluminum oxide containing silver activated zinc sulfide blue-emitting cathodoluminescent phosphor composition having a reduced decay time comprising:

a. forming a relatively uniform mixture consisting essentially of zinc sulfide, a silver source selected from silver salts having a decomposition temperature below 1,700° F., from about 0.1 percent to about 6 percent by weight of a thermally decomposable aluminum source, greater than about 0.01 percent to less than about 5 percent by weight of an alkali metal flux and greater than about 0.01 percent and less than about 5 percent by weight of an alkaline earth metal flux;

b. heating said mixture to a temperature of at least about 1,700° F. in an oxidizing atmosphere for a time sufficient to produce a blue-emitting phosphor composition, and c. washing said composition with deionized water.

5. A process according to claim 4 wherein said alkali metal is sodium.

6. A process according to claim 5 wherein said alkaline earth metal is selected from the group consisting of barium, magnesium and mixtures thereof.

* * * * *